(12) United States Patent
Hong et al.

(10) Patent No.: US 11,663,469 B2
(45) Date of Patent: May 30, 2023

(54) ARTIFICIAL DEVICE AND METHOD FOR CONTROLLING THE SAME

(71) Applicant: LG ELECTRONICS INC., Seoul (KR)

(72) Inventors: Jinhwa Hong, Seoul (KR); Soojin Lee, Seoul (KR); Ilhwan Choi, Seoul (KR); Munho Yun, Seoul (KR); Sunghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 581 days.

(21) Appl. No.: 16/796,011

(22) Filed: Feb. 20, 2020

(65) Prior Publication Data

US 2021/0064991 A1    Mar. 4, 2021

(30) Foreign Application Priority Data

Aug. 30, 2019 (KR) .......................... 10-2019-0107556

(51) Int. Cl.
*G06N 3/08* (2023.01)
*G06Q 10/02* (2012.01)
*H04W 4/02* (2018.01)

(52) U.S. Cl.
CPC ............... *G06N 3/08* (2013.01); *G06Q 10/02* (2013.01)

(58) Field of Classification Search
None
See application file for complete search history.

(56) References Cited

U.S. PATENT DOCUMENTS

| 11,092,455 B2* | 8/2021 | Rowley | G08G 1/096811 |
| 2010/0153007 A1* | 6/2010 | Crowley | G01C 21/3889 |
| | | | 701/467 |

(Continued)

FOREIGN PATENT DOCUMENTS

| JP | 2010-108182 A | 5/2010 |
| KR | 10-2015-0122412 A | 11/2015 |

(Continued)

*Primary Examiner* — Saba Tsegaye
(74) *Attorney, Agent, or Firm* — Birch, Stewart, Kolasch & Birch, LLP

(57) ABSTRACT

A method for controlling an artificial intelligent (AI) device providing a travel service, and which includes learning, via a processer of the AI device, a plurality of daily patterns related with a user's wake-up time, a commuting time, and a travel route using a deep neural networks (DNN) model; determining, via the processor, whether the daily patterns satisfy predetermined conditions each time a corresponding daily pattern among the plurality of daily patterns is generated; determining, via the processor, that the user is currently traveling when at least one daily pattern among the plurality of daily patterns that does not satisfy the predetermined conditions is detected; setting, via the processor, a time when the at least one daily pattern that does not satisfy the predetermined conditions is detected for a first time as a starting point of travel; setting, via the processor, a time from the starting point of the travel to an end point of the travel as a travel period of the user when an end of the user's travel is detected; and outputting travel information related with the travel period.

14 Claims, 12 Drawing Sheets

(56) References Cited

U.S. PATENT DOCUMENTS

| | | | |
|---|---|---|---|
| 2012/0130727 A1* | 5/2012 | Ahmed | G06Q 30/02 |
| | | | 705/1.1 |
| 2019/0152492 A1* | 5/2019 | el Kaliouby | G06V 40/172 |
| 2020/0166372 A1* | 5/2020 | Watanabe | G01C 21/3676 |
| 2021/0368036 A1* | 11/2021 | Yankov | G01C 21/3617 |

FOREIGN PATENT DOCUMENTS

| | | |
|---|---|---|
| KR | 10-2017-0018695 A | 2/2017 |
| KR | 10-2019-0047350 A | 5/2019 |

\* cited by examiner

FIG. 11
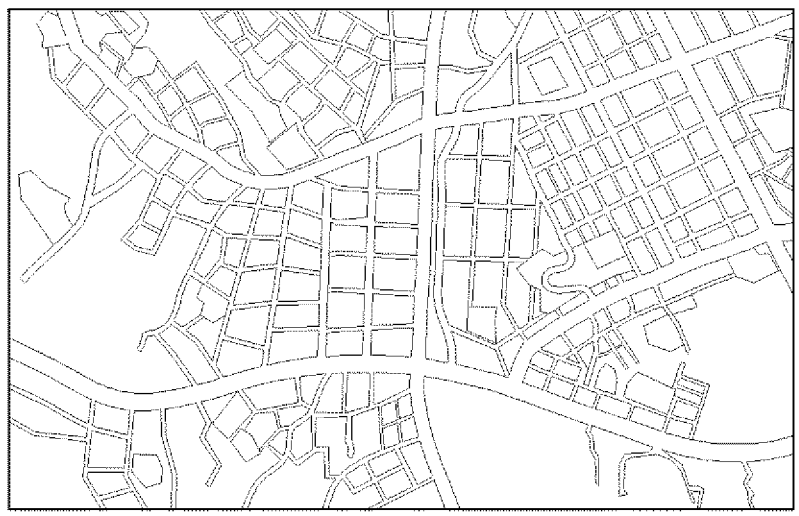
(a)
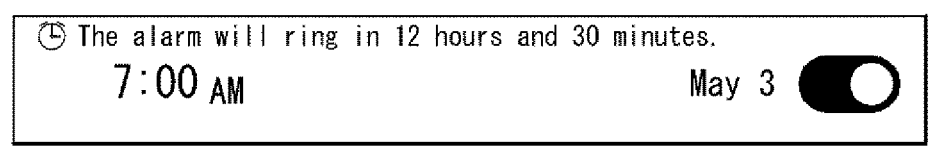
(b)

FIG. 12

| |
|---|
| CALENDAR ALARM |
| • INSURANCE SUBMISSION (SURGERY, HOSPITAL FEES)<br>FRIDAY 26 APRIL |
| • BOOK ORGANIZER<br>SATURDAY, 27 APRIL |

(a)

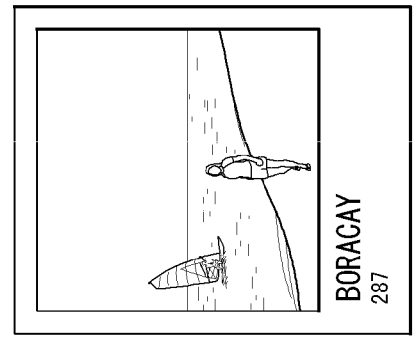

BORACAY
287

(b)

| | |
|---|---|
| GS25 HAN RIVER BANPO FIRST SHOP<br>19.05.06 15:39 LUMP SUM | 14,900 WON⟩ |
| SHINSEGAE DEPARTMENT STORE GANGNAM SHOP<br>19.05.06 11:25 LUMP SUM | 14,000 WON⟩ |
| SHINSEGAE DEPARTMENT STORE GANGNAM SHOP<br>19.05.06 11:20 LUMP SUM | 10,000 WON⟩ |
| SHINSEGAE DEPARTMENT STORE GANGNAM SHOP<br>19.05.06 11:18 LUMP SUM | 4,600 WON⟩ |
| EMART 24 MARRIOTT SHOP<br>19.05.05 21:53 LUMP SUM | 3,750 WON⟩ |
| SHINSEGAE DRUM CITY HOTEL PART<br>19.05.05 15:29 LUMP SUM | 266,200 WON⟩ |
| EMART 24 CENTRAL KIOSK SHOP<br>19.05.05 14:36 LUMP SUM | 1,000 WON⟩ △ TOP |
| SHAKE SHACK BANPO CENTRAL CITY SHOP<br>19.05.05 14:12 LUMP SUM | 26,700 WON⟩ |

(c)

ARTIFICIAL DEVICE AND METHOD FOR CONTROLLING THE SAME

CROSS-REFERENCE TO RELATED APPLICATION

Pursuant to 35 U.S.C. § 119(a), this application claims the benefit of an earlier filing date and priority to Korean Application No. 10-2019-0107556 filed in the Republic of Korea on Aug. 30, 2019, the contents of which are incorporated by reference herein in its entirety.

BACKGROUND OF THE INVENTION

Field of the Invention

The present disclosure relates to an artificial device and a method for controlling the same, and more particularly, to a method for learning user's daily patterns using a deep neural networks (DNN) model and providing a travel service based on the same.

Discussion of the Related Art

Recently, as people's interest in work & life balance increases, user's interest and frequency in traveling to the country as well as abroad is increasing. However, the existing travel service providing method checks only a user's current location, and provides only a service that enables a user to search for local information and services about the user's current location or a place near the current location. That is, the existing travel service providing method has a limitation in providing more accurate and more services to the user during the user's travel period in that it provides only the travel related service based on the current location.

SUMMARY OF THE INVENTION

Accordingly, the present disclosure aims to solve the above-mentioned necessity and/or problems, and is to learn user's daily patterns using a DNN model, determine that a user is traveling if the user's pattern does not meet the daily patterns, and provide travel information for a travel period and the travel information after an end of travel.

Objects of the present disclosure are not limited to the above-mentioned objects. That is, other objects that are not mentioned may be obviously understood by those skilled in the art to which the present disclosure pertains from the following detailed description.

In an aspect, a method for controlling an artificial device providing a travel service includes: learning daily patterns related with a user's wake-up time, commuting time, and travel route using a deep neural networks (DNN) model; determining whether the daily patterns satisfy predetermined conditions for each pattern every time the patterns are generated; determining that the user is currently traveling when at least one pattern that does not satisfy the corresponding conditions is detected; setting a time when the pattern that does not satisfy the corresponding conditions is detected for the first time as a starting point of travel; setting a time from the starting point of the travel to an end point of the travel as a travel period of the user when the end of the user's travel is detected; and providing travel information related with the travel period.

As the number of patterns that does not satisfy the conditions increases, accuracy of the determination on whether the user is traveling may increase.

In another aspect, an artificial device for providing a travel service includes: a communication module configured to transmit and receive a wireless signal; a memory; a display configured to display travel information related with a travel period to a user; and a processor, wherein the processor performs control to learn daily patterns related with a user's wake-up time, commuting time, and travel route using a deep neural networks (DNN) model, determine whether the daily patterns satisfy predetermined conditions for each daily pattern every time the patterns are generated, determines that the user is currently traveling when detecting at least one pattern that does not satisfy the corresponding conditions, set a time when the pattern that does not satisfy the corresponding conditions is detected for the first time as a starting point of the travel, and set a time from the starting point of the travel to an end point of the travel as a travel period of the user when the end of the user's travel is detected.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 11 is a diagram illustrating an example of a travel service during a travel period provided by the present disclosure.

FIG. 12 is a diagram illustrating an example of a travel service during an end of travel provided by the present disclosure.

The accompanying drawings, which are included as part of the detailed description to assist understanding of the disclosure, illustrate embodiments of the disclosure and explain the technical features of the disclosure together with the detailed description.

DETAILED DESCRIPTION OF THE EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another. When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise. In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
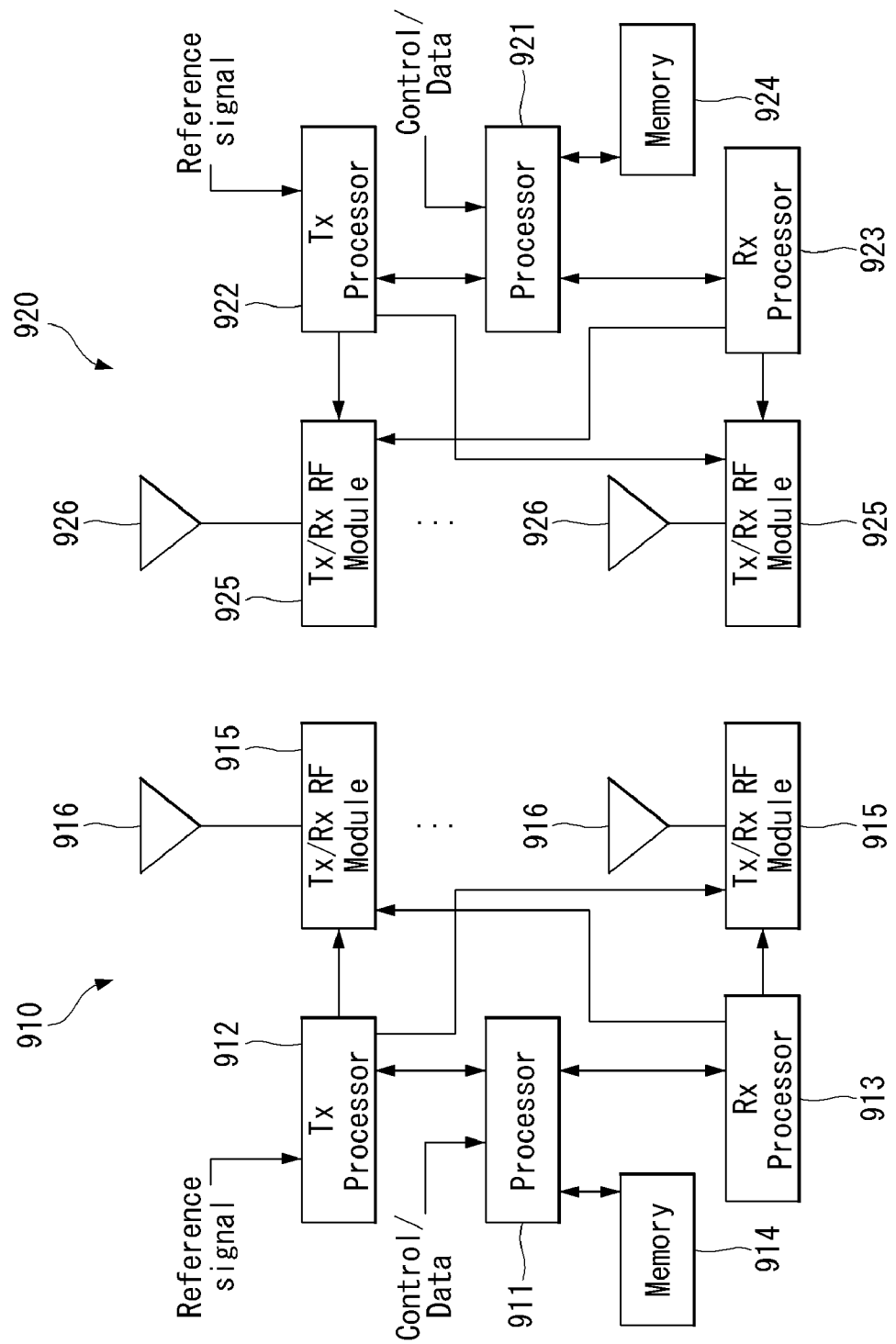
FIG. 1 is a block diagram of a wireless communication system to which methods provided in the disclosure are applicable.

FIG. 1 is a block diagram of a wireless communication system to which methods provided in the disclosure are applicable. Referring to FIG. 1, a robot is defined as a first communication device 910, and a processor 911 can perform detailed operations of the robot.

A 5G network communicating with the robot is defined as a second communication device 920, and a processor 921 can perform detailed autonomous operations. Here, the 5G network may include another robot communicating with the robot. The 5G network may be represented as the first communication device, and the robot may be represented as the second communication device.

For example, the first communication device or the second communication device may be a base station, a network node, a transmission terminal, a reception terminal, a wireless device, a wireless communication device, a robot, or the like. For example, a terminal or user equipment (UE) may include a robot, a drone, an unmanned aerial vehicle (UAV), a cellular phone, a smart phone, a laptop computer, a digital broadcast terminal, a personal digital assistant (PDA), a portable multimedia player (PMP), a navigation device, a slate PC, a tablet PC, an ultrabook, a wearable device (e.g., a smart watch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
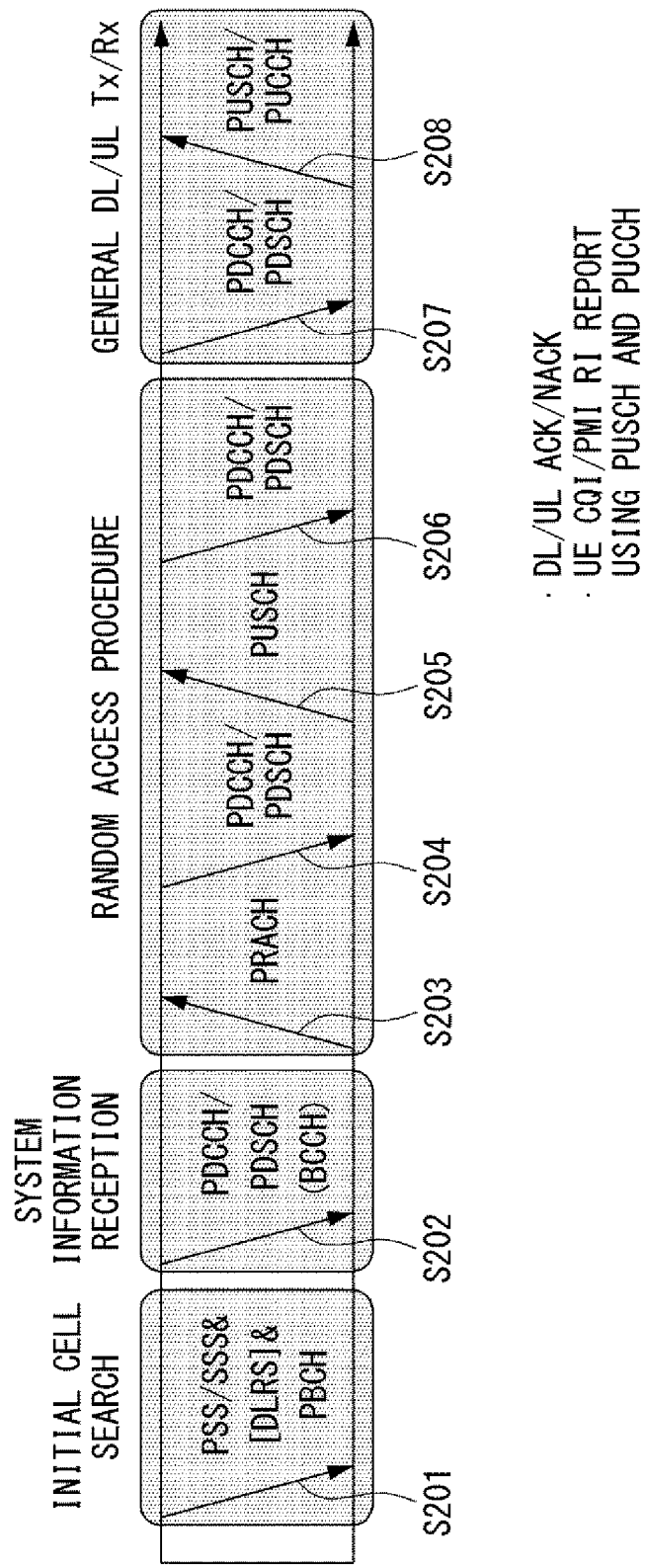
FIG. 2 is a diagram showing an example of a signal transmission/reception method in a wireless communication system.

FIG. 2 is a diagram showing an example of a signal transmission/reception method in a wireless communication system. Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). Thus, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission based on DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2. The UE can perform cell search, system information acquisition, beam alignment for initial access, and DL measurement based on an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described. SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2. A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission based on most recent path loss and a power ramping counter.

The UE can perform UL transmission through Msg3 of the random access procedure over a physical uplink shared channel based on the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described. Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS based on the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described. An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted based on SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS based on the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data based on signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Robots Using 5G Communication

Figure 3:
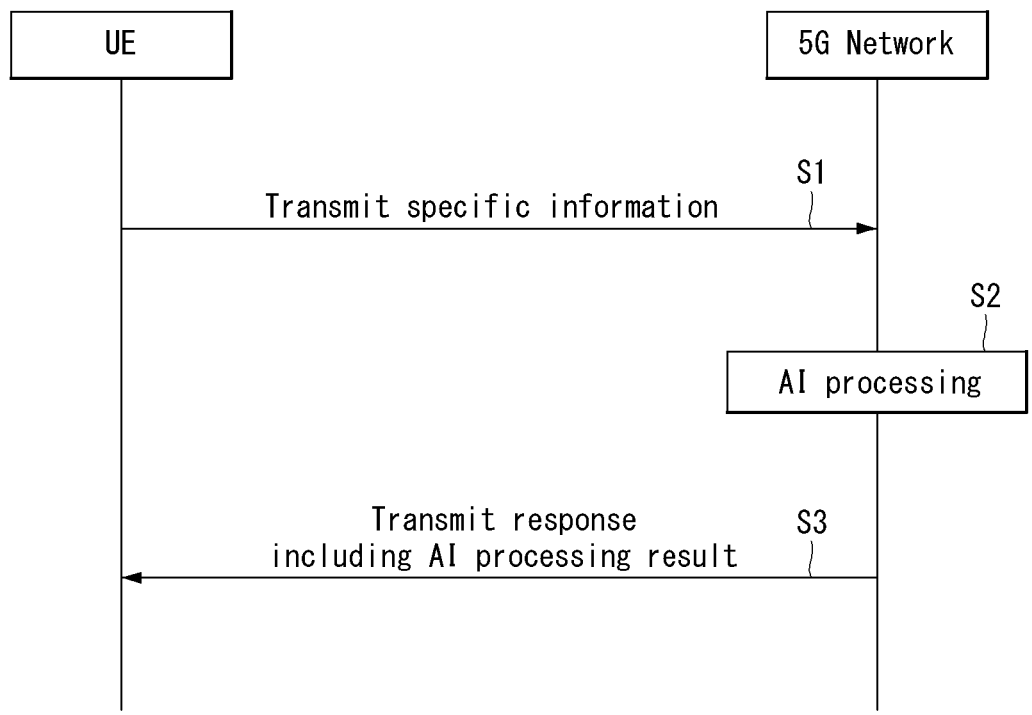
FIG. 3 shows an example of basic operations of a robot and a 5G network in a 5G communication system.

FIG. 3 shows an example of basic operations of a robot and a 5G network in a 5G communication system. The robot transmits specific information to the 5G network (S1). The specific information may include autonomous driving related information. In addition, the 5G network can determine whether to remotely control the robot (S2). Here, the 5G network may include a server or a module which performs remote control related to autonomous driving. In addition, the 5G network can transmit information (or signal) related to remote control to the robot (S3).

G. Applied Operations Between Autonomous Robot and 5G Network in 5G Communication System Hereinafter, the operation of a robot using 5G communication will be described in more detail with reference to wireless communication technology (BM procedure, URLLC, mMTC, etc.) described in FIGS. 1 and 2. First, a basic procedure of an applied operation to which a method provided by the present disclosure which will be described later and eMBB of 5G communication are applied will be described.

As in steps S1 and S3 of FIG. 3, the robot performs an initial access procedure and a random access procedure with the 5G network prior to step S1 of FIG. 3 in order to transmit/receive signals, information and the like to/from the 5G network. More specifically, the robot performs an initial access procedure with the 5G network based on an SSB in order to acquire DL synchronization and system information. A beam management (BM) procedure and a beam failure recovery procedure may be added in the initial access procedure, and quasi-co-location (QCL) relation may be added in a process in which the robot receives a signal from the 5G network.

In addition, the robot performs a random access procedure with the 5G network for UL synchronization acquisition and/or UL transmission. The 5G network can transmit, to the robot, a UL grant for scheduling transmission of specific information. Accordingly, the robot transmits the specific information to the 5G network based on the UL grant. In addition, the 5G network transmits, to the robot, a DL grant for scheduling transmission of 5G processing results with respect to the specific information. Accordingly, the 5G network can transmit, to the robot, information (or a signal) related to remote control based on the DL grant.

Next, a basic procedure of an applied operation to which a method provided by the present disclosure which will be described later and URLLC of 5G communication are applied will be described. As described above, a robot can receive DownlinkPreemption IE from the 5G network after the robot performs an initial access procedure and/or a random access procedure with the 5G network. Then, the robot receives DCI format 2_1 including a preemption indication from the 5G network based on DownlinkPreemption IE. The robot does not perform (or expect or assume) reception of eMBB data in resources (PRBs and/or OFDM symbols) indicated by the preemption indication. Thereafter, when the robot needs to transmit specific information, the robot can receive a UL grant from the 5G network.

Next, a basic procedure of an applied operation to which a method provided by the present disclosure which will be described later and mMTC of 5G communication are applied will be described. Description will focus on parts in the steps of FIG. 3 which are changed according to application of mMTC.

In step S1 of FIG. 3, the robot receives a UL grant from the 5G network in order to transmit specific information to the 5G network. Here, the UL grant may include information on the number of repetitions of transmission of the specific information and the specific information may be repeatedly transmitted based on the information on the number of repetitions. That is, the robot transmits the specific information to the 5G network based on the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods provided in the present disclosure which will be described later and applied or can complement the methods provided in the present disclosure to make technical features of the methods concrete and clear.

Figure 4:
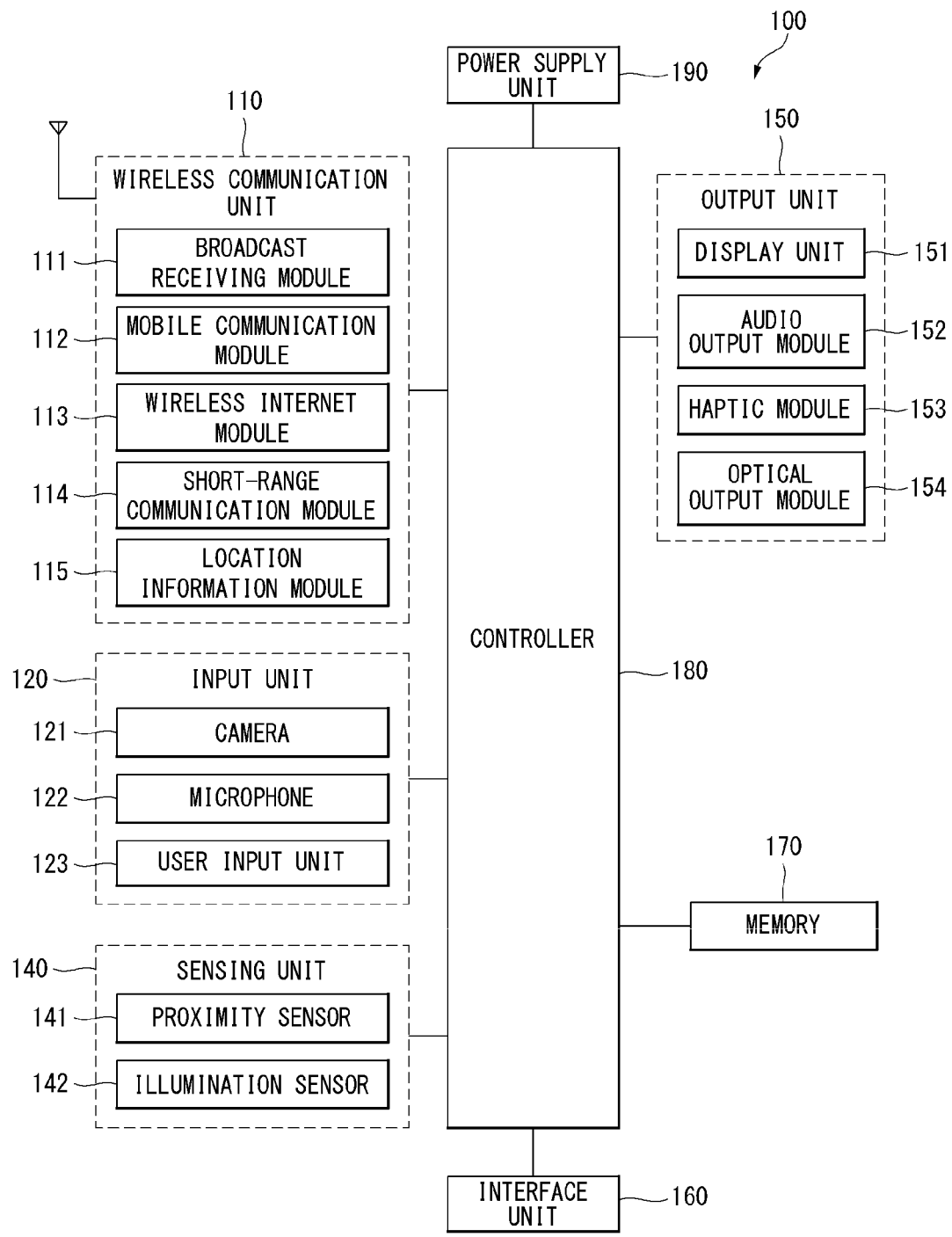
FIG. 4 is a block diagram illustrating a mobile terminal related to the present disclosure.
Figure 5:
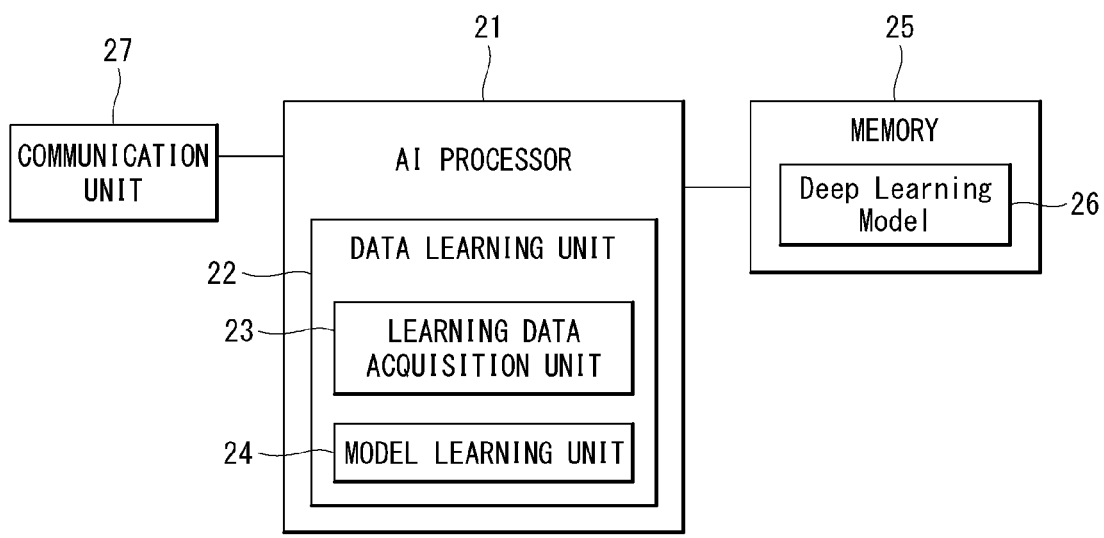
FIG. 5 is a block diagram of an AI device in accordance with the embodiment of the present disclosure.

FIG. 4 is a block diagram illustrating a mobile terminal related to the present disclosure. Referring to FIG. 4, a mobile terminal 100 may include a wireless communication unit 110, an input unit 120, a sensing unit 140, an output unit 150, an interface unit 160, a memory 170, a controller 180, and a power supply unit 190. The components shown in FIG. 5 are not essential to implementing a mobile terminal and thus a mobile terminal described in the present description may have more or fewer components than those listed above.

More specifically, among the components, the wireless communication unit 110 may include at least one module that enables wireless communication between the mobile terminal 100 and the wireless communication system, between the mobile terminal 100 and another mobile terminal 100, or between the mobile terminal 100 and an external server. Further, the wireless communication unit 110 may include at least one module for connecting the mobile terminal 100 to at least one 5G network. A detailed description thereof has been described in detail with reference to FIGS. 1 to 4, and thus a description thereof will be omitted.

The wireless communication unit 110 may include at least one of a broadcast receiving module 111, a mobile communication module 112, a wireless Internet module 113, a short-range communication module 114, and a position (location) information module 115. The input unit 120 may include a camera 121 or an image input unit for inputting an image signal, a microphone 122 for inputting an audio signal, an audio input unit, or a user input unit 123, for example, a touch key and a mechanical key for receiving information from a user. Audio data or image data collected by the input unit 120 may be analyzed and be processed as a control command of the user.

The sensing unit 140 may include at least one sensor for sensing at least one of information in the mobile terminal, surrounding environment information enclosing the mobile terminal, and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, a red, green, and blue (RGB) sensor, an infrared sensor (IR sensor), a fingerprint scan sensor, an ultrasonic sensor, an optical sensor (e.g., the camera 121), a microphone 122, a battery gauge, an environment sensor (e.g., barometer, hygrometer, thermometer, radiation detection sensor, thermal detection sensor, gas detection sensor), a chemical sensor (e.g., electronic nose, healthcare sensor, biometric recognition sensor). The mobile terminal disclosed in the present specification may utilize a combination of information detected by at least two or more of these sensors.

The output unit 150 generates an output related to sight, hearing, or tactile sense, and may include at least one of a display unit 151, an audio output unit 152, a haptic module 153, and a light (optical) output unit 154. The display unit 151 may form a mutual layer structure with the touch sensor or may be integrally formed with the touch sensor, thereby implementing a touch screen. The touch screen may provide an output interface between the mobile terminal 100 and the user while functioning as the user input unit 123 that provides an input interface between the mobile terminal 100 and the user.

The interface unit 160 serves as a path to various types of external devices connected to the mobile terminal 100. The interface unit 160 may include at least one of a wired/wireless headset port, an external charger port, a wired/wireless data port, a memory card port, a port that connects a device equipped with an identification module, an audio input/output (I/O) port, a video input/output (I/O) port, and an earphone port. In the mobile terminal 100, the appropriate control related to a connected external device may be performed according to the external device connected to the interface unit 160.

Further, the memory 170 stores data that support various functions of the mobile terminal 100. The memory 170 may store a plurality of application programs or applications driven in the mobile terminal 100, data for operating the mobile terminal 100, and instructions. At least some of these application programs may be downloaded from an external server through wireless communication. Further, at least some of these application programs may exist on the mobile terminal 100 from the time of launching for basic functions (e.g., a call receiving or transmitting function, a message receiving or transmitting function) of the mobile terminal 100. The application program may be stored in the memory 170, installed on the mobile terminal 100, and driven by the controller 180 to perform an operation (or function) of the mobile terminal.

In addition to the operation related to the application program, the controller 180 typically controls an overall operation of the mobile terminal 100. By processing signals, data, information, and the like, which are input or output through the above-described components or by driving an application program stored in the memory 170, the controller 180 can provide or process information or a function appropriate to a user.

Further, in order to drive an application program stored in the memory 170, the controller 180 can control at least some of the components described with reference to FIG. 5. Further, in order to drive the application program, the controller 180 can combine and operate at least two or more of the components included in the mobile terminal 100.

The power supply unit 190 receives power from an external power source and an internal power source under the control of the controller 180 to supply power to each component included in the mobile terminal 100. The power supply unit 190 includes a battery, which may be a built-in battery or a replaceable battery.

In order to implement an operation, control, or control method of the mobile terminal according to various embodiments described below, at least some of the components may operate in cooperation with each other. Further, the operation, control, or control method of the mobile terminal may be implemented on the mobile terminal by driving at least one application program stored in the memory 170.

The display unit 151 displays (outputs) information processed by the mobile terminal 100. For example, the display unit 151 may display execution screen information of an application program driven in the mobile terminal 100 or user interface (UI) and graphical user interface (GUI) information according to the execution screen information. The display unit 151 may include at least one of a liquid crystal display (LCD), a thin film transistor-liquid crystal display (TFT LCD), an organic light-emitting diode (OLED), a flexible display, a three-dimensional display (3D display), and an e-ink display.

Further, there may be two or more display units 151 according to an implementation form of the mobile terminal 100. In this instance, in the mobile terminal 100, a plurality of display units may be separated at one surface or may be integrally disposed, and at different surfaces, each display unit may be disposed.

In order to receive a control command by a touch method, the display unit 151 may include a touch sensor that detects a touch on thereon. Using this, when a touch is performed on the display unit 151, the touch sensor may detect the touch, and the controller 180 can generate a control command corresponding to the touch based on the touch. The content input by the touch method may be texts or numbers or menu items that may be instructed or designated in various modes.

The touch sensor may be configured in a form of a film having a touch pattern and be disposed between a window and a display on a rear surface of the window or may be a metal wire directly patterned on the rear surface of the window. Alternatively, the touch sensor may be formed integrally with the display. For example, the touch sensor may be disposed on a substrate of the display or may be provided inside the display.

In this way, the display unit 151 may form a touch screen together with the touch sensor, and in this instance, the touch screen may function as the user input unit 123. In some cases, the touch screen may replace at least some functions of a first manipulation unit.

The first sound output unit may be implemented into a receiver for transmitting a call sound to the user's ear, and the second sound output unit may be implemented in the form of a loud speaker that outputs various alarm sounds or reproduction sounds of multimedia. A sound hole for emitting a sound generated from the first sound output unit may be formed in the window of the display unit 151. However, the present disclosure is not limited thereto, and the sound may be emitted along an assembly gap between the structures (e.g., a gap between the window and the front case). In this instance, an independently formed hole for sound output may be externally invisible or hidden, thereby more simplifying an external shape of the mobile terminal 100.

The light output unit 154 may be configured to output light for notifying when an event occurs. Examples of the event may include message reception, call signal reception, missed call, alarm, schedule notification, email reception, information reception through an application, and the like. When the user's event check is detected, the controller 180 can control the light output unit 154 so as to end the light output.

The first camera processes an image frame of still pictures or moving pictures obtained by image sensors in an audio-visual call mode or a photographing mode. The processed image frames may be displayed on the display unit 151 and be stored in the memory 170.

The first to third manipulation units may be collectively referred to as a manipulating portion as an example of the user input unit 123 manipulated to receive a command for controlling an operation of the mobile terminal 100. The first to third manipulation units may be employed in any manner as long as the user manipulates with a tactile feeling such as touch, push, scroll, and the like. Further, the first and second manipulation units may be employed so the first and second manipulation units operate without a tactile feeling of the user through a proximity touch, a hovering touch, or the like. The third manipulation unit may include a fingerprint recognition sensor to obtain a user's fingerprint. The obtained fingerprint information may be provided to the controller 180.

In the drawing, the first manipulation unit is illustrated as being a touch key, but the present disclosure is not limited thereto. For example, the first manipulation unit may be a mechanical key or may be configured with a combination of a touch key and a mechanical key.

The contents input by the first and second manipulation units may be variously set. For example, the first manipulation unit may receive a command such as a menu, a home key, a cancellation, a search, etc., and the second manipulation unit may receive adjustment in a volume of a sound output from the first or second sound output unit and a command such as switching to a touch recognition mode of the display unit 151.

As another example of the user input unit 123, a third manipulation unit may be provided at the rear surface of the terminal body. The third manipulation unit is manipulated to receive a command for controlling an operation of the mobile terminal 100, and the input content may be variously set.

For example, commands such as power on/off, start, end, and scrolling and commands such as adjustment in a volume of a sound output from the first and second sound output units, switching to a touch recognition mode of the display unit 151, and fingerprint information acquisition may be received. The rear input unit may be implemented in a form of a touch input, a push input, or an input by a combination thereof.

The rear input unit may be disposed to overlap with the front display unit 151 in a thickness direction of the terminal body. For example, the rear input unit may be disposed at the upper end of a rear surface of the terminal body so that the user may easily manipulate the terminal using an index finger when the user grips the terminal body with one hand. However, the present disclosure is not necessarily limited thereto, and a position of the rear input unit may be changed.

In this way, when the rear input unit is provided at the rear surface of the terminal body, a new type user interface using the rear input unit may be implemented. Further, when the above-described touch screen or rear input unit replaces at least some functions of the first manipulation unit provided in the front surface of the terminal body and the first manipulation unit is not disposed at the front surface of the terminal body, the display unit 151 may be configured in a larger surface.

The mobile terminal 100 may be provided with a fingerprint recognition sensor for recognizing a user's fingerprint, and the controller 180 can use fingerprint information detected through the fingerprint recognition sensor as an authentication means. The fingerprint recognition sensor may be embedded in the display unit 151 or the user input unit 123.

The microphone 122 may be configured to receive a user's voice, other sounds, and the like. The microphone 122 may be provided at a plurality of positions and be configured to receive a stereo sound.

The interface unit 160 serves as a path for connecting the mobile terminal 100 to an external device. For example, the interface unit 160 may be at least one of a connection terminal for connecting to another device (e.g., an earphone or an external speaker), a port (e.g., infrared port (IrDA Port), Bluetooth port, or a wireless LAN port) for short-range communication, or a power supply terminal for supplying power to the mobile terminal 100. The interface unit 160 may be implemented in the form of a socket for receiving an external card such as a subscriber identification module (SIM), a user identity module (UIM), or a memory card for storing information.

The second camera may be disposed at the rear surface of the terminal body. In this instance, a second camera 121*b* has a photographing direction substantially opposite to that of the first camera. The second camera may include a plurality of lenses arranged along at least one line. The plurality of lenses may be arranged in a matrix format. Such a camera may be referred to as an "array camera." When the second camera is configured as an array camera, the plurality of lenses may be used to photograph images in various ways, and images of a better quality may be obtained.

A flash 124 may be disposed adjacent to the second camera. When a subject is photographed by the second camera, the flash 124 emits light toward the subject. The second sound output unit may be additionally disposed in the terminal body. The second sound output unit may implement a stereo function together with the first sound output unit, and may be used for implementing a speakerphone mode during a call.

The terminal body may be provided with at least one antenna for wireless communication. The antenna may be built in the terminal body or may be formed in the case. For example, an antenna that forms part of the broadcast receiving module 111 (see FIG. 5) may be configured to be pulled out from the terminal body. Alternatively, the antenna may be formed in a film type to be attached to an inner side surface of the rear cover 103 or may be configured such that a case including a conductive material functions as an antenna.

The terminal body is provided with the power supply unit 190 (see FIG. 5) for supplying power to the mobile terminal 100. The power supply unit 190 may include a battery 191 embedded in the terminal body or detachably configured from the outside of the terminal body.

The battery 191 may be configured to receive power through a power cable connected to the interface unit 160. Further, the battery 191 may be configured to enable wireless charging through a wireless charger. The wireless charging may be implemented by a magnetic induction method or a resonance method (magnetic resonance method).

FIG. 5 is a block diagram of an AI device in accordance with the embodiment of the present disclosure. The AI device 20 may include electronic equipment that includes an AI module to perform AI processing or a server that includes the AI module. Furthermore, the AI device 20 may be included in at least a portion of the intelligent device 100 illustrated in FIG. 4, and may be provided to perform at least some of the AI processing.

The AI processing may include all operations related to the function of the intelligent device 100 illustrated in FIG. 4. For example, the mobile terminal may AI-process sensing data or travel data to perform processing/determining and a control-signal generating operation. Furthermore, for example, the mobile terminal may AI-process data acquired through interaction with other electronic equipment provided in the mobile terminal to control sensing.

The AI device 20 may include an AI processor 21, a memory 25 and/or a communication unit 27. The AI device 20 may be a computing device capable of learning a neural network, and may be implemented as various electronic devices such as a server, a desktop PC, a laptop PC or a tablet PC.

The AI processor 21 may learn the neural network using a program stored in the memory 25. Particularly, the AI processor 21 may learn the neural network for recognizing data related to the intelligent device 100. Here, the neural network for recognizing data related to the intelligent device 100 may be designed to simulate a human brain structure on the computer, and may include a plurality of network nodes having weights that simulate the neurons of the human neural network. The plurality of network nodes may exchange data according to the connecting relationship to simulate the synaptic action of neurons in which the neurons exchange signals through synapses. Here, the neural network may include the deep learning model developed from the neural network model. While the plurality of network nodes is located at different layers in the deep learning model, the nodes may exchange data according to the convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM), a deep belief network (DBN) or a deep Q-Network, and may be applied to fields such as computer vision, voice recognition, natural language processing, voice/signal processing or the like.

Meanwhile, the processor performing the above-described function may be a general-purpose processor (e.g. CPU), but may be an AI dedicated processor (e.g. GPU) for artificial intelligence learning. The memory 25 may store various programs and data required to operate the AI device 20. The memory 25 may be implemented as a non-volatile memory, a volatile memory, a flash memory), a hard disk drive (HDD) or a solid state drive (SDD). The memory 25 may be accessed by the AI processor 21, and reading/writing/correcting/deleting/update of data by the AI processor 21 may be performed.

Furthermore, the memory 25 may store the neural network model (e.g. the deep learning model 26) generated through a learning algorithm for classifying/recognizing data in accordance with the embodiment of the present disclosure. The AI processor 21 may include a data learning unit 22 which learns the neural network for data classification/recognition. The data learning unit 22 may learn a criterion about what learning data is used to determine the data classification/recognition and about how to classify and recognize data using the learning data. The data learning unit 22 may learn the deep learning model by acquiring the learning data that is used for learning and applying the acquired learning data to the deep learning model.

The data learning unit 22 may be made in the form of at least one hardware chip and may be mounted on the AI device 20. For example, the data learning unit 22 may be made in the form of a dedicated hardware chip for the artificial intelligence AI, and may be made as a portion of the general-purpose processor (CPU) or the graphic dedicated processor (GPU) to be mounted on the AI device 20. Furthermore, the data learning unit 22 may be implemented as a software module. When the data learning unit is implemented as the software module (or a program module including instructions), the software module may be stored in a non-transitory computer readable medium. In this instance, at least one software module may be provided by an operating system (OS) or an application.

The data learning unit 22 may include the learning-data acquisition unit 23 and the model learning unit 24. The learning-data acquisition unit 23 may acquire the learning data needed for the neural network model for classifying and recognizing the data. For example, the learning-data acquisition unit 23 may acquire vehicle data and/or sample data which are to be input into the neural network model, as the learning data.

The model learning unit 24 may learn to have a determination criterion about how the neural network model classifies predetermined data, using the acquired learning data. The model learning unit 24 may learn the neural network model, through supervised learning using at least some of the learning data as the determination criterion. Alternatively, the model learning unit 24 may learn the neural network model through unsupervised learning that finds the determination criterion, by learning by itself using the learning data without supervision. Furthermore, the model learning unit 24 may learn the neural network model through reinforcement learning using feedback on whether the result of situation determination according to the learning is correct. Furthermore, the model learning unit 24 may learn the neural network model using the learning algorithm including error back-propagation or gradient descent.

If the neural network model is learned, the model learning unit 24 may store the learned neural network model in the memory. The model learning unit 24 may store the learned neural network model in the memory of the server connected to the AI device 20 with a wire or wireless network.

The data learning unit 22 may further include a learning-data preprocessing unit and a learning-data selection unit to improve the analysis result of the recognition model or to save resources or time required for generating the recognition model. The learning-data preprocessing unit may preprocess the acquired data so that the acquired data may be used for learning for situation determination. For example, the learning-data preprocessing unit may process the acquired data in a preset format so that the model learning unit 24 may use the acquired learning data for learning for image recognition.

Furthermore, the learning-data selection unit may select the data required for learning among the learning data acquired by the learning-data acquisition unit 23 or the learning data preprocessed in the preprocessing unit. The selected learning data may be provided to the model learning unit 24. For example, the learning-data selection unit may select only data on the object included in a specific region as the learning data, by detecting the specific region in the image acquired by the camera of the intelligent device 100.

Furthermore, the data learning unit 22 may further include a model evaluation unit to improve the analysis result of the neural network model. When the model evaluation unit inputs evaluated data into the neural network model and the analysis result output from the evaluated data does not satisfy a predetermined criterion, the model learning unit 22 may learn again. In this instance, the evaluated data may be predefined data for evaluating the recognition model. By way of example, the model evaluation unit may evaluate that the predetermined criterion is not satisfied when the number or ratio of the evaluated data in which the analysis result is inaccurate among the analysis result of the learned recognition model for the evaluated data exceeds a preset threshold.

The communication unit 27 may transmit the AI processing result by the AI processor 21 to the external electronic equipment. Here, the external electronic equipment may be defined as the intelligent device 100. Furthermore, the AI device 20 may be defined as another intelligent device 100 or a 5G network that communicates with the intelligent device 100. Meanwhile, the AI device 20 may be implemented by being functionally embedded in an autonomous driving module provided in the intelligent device 100. Furthermore, the 5G network may include a server or a module that performs related control of the intelligent device 100.

Although the AI device 20 illustrated in FIG. 5 is functionally divided into the AI processor 21, the memory 25, the communication unit 27 and the like, it is to be noted that the above-described components are integrated into one module, which is referred to as an AI module.

Figure 6:
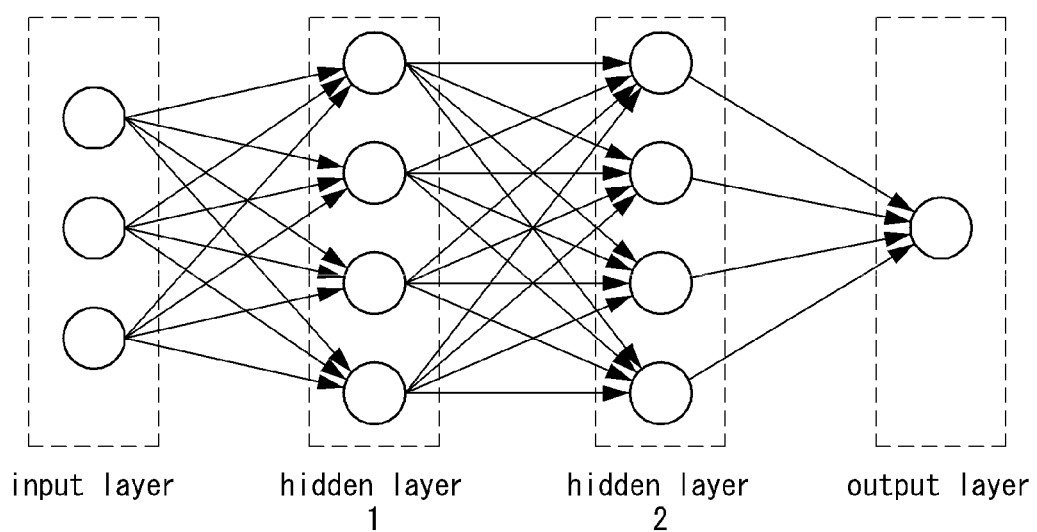
FIG. 6 is a diagram illustrating a deep neural network structure for a notification providing method provided in the present specification.

FIG. 6 is a diagram illustrating a deep neural network structure for a notification providing method provided in the present specification. The deep neural network (DNN) shown in FIG. 6 is an example of a learning method used for extracting valid information from information detected through a plurality of sensors as described above, or for extracting valid information to recognize a surrounding situation.

Referring to FIG. 6, the DNN is an artificial neural network (ANN) configured with several hidden layers between an input layer and an output layer. The DNN may model complex non-linear relationships, as in a general artificial neural network. For example, in a deep neural network structure for an object identification model, each object may be represented with a hierarchical configuration of basic elements of an image. In this instance, the additional layers may combine characteristics of gradually gathered lower layers. Such a characteristic of the deep neural network may model complex data with only fewer units (nodes), compared with a similarly performed artificial neural network.

POI Data

Figure 7:
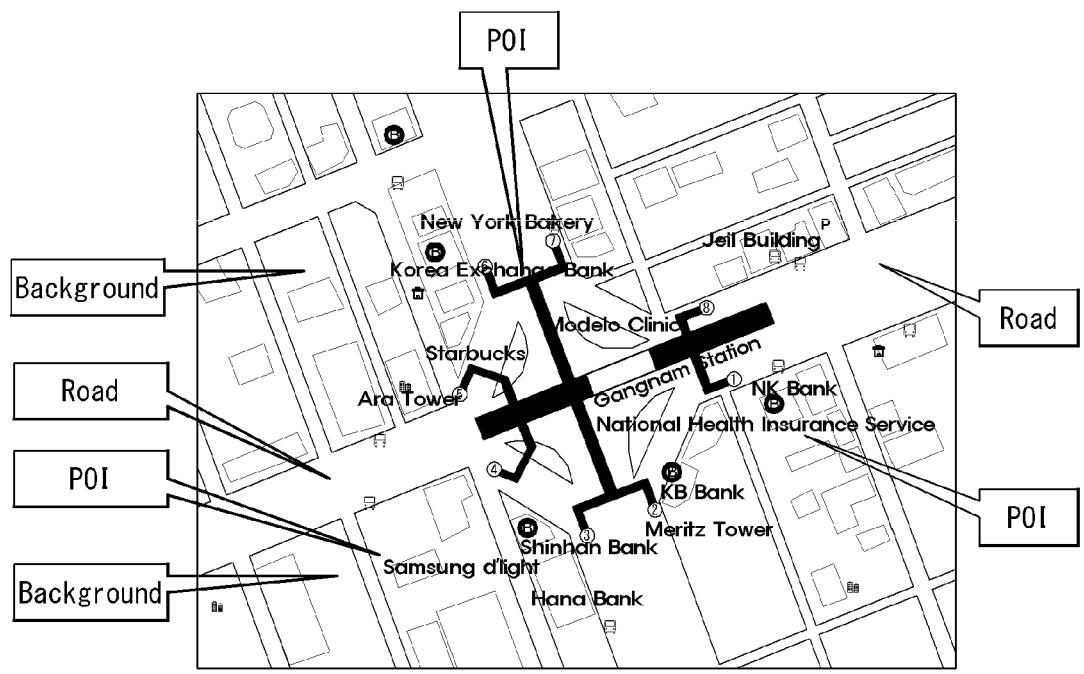
FIG. 7 is an exemplary diagram of an electronic map with point of interest (POI) data to which the present disclosure can be applied.

FIG. 7 is an exemplary diagram of an electronic map with point of interest (POI) data to which the present disclosure can be applied. The point of interest (POI) data refers to data representing major facilities, stations, airports, terminals, hotels, department stores, and the like which are represented by coordinates along with geographic information on an electronic map.

The electronic map may be composed of three elements, for example, a point, a line, and a polygon. On an electronic map, each of the three elements can be displayed as POI data, roads, and background.

Referring to FIG. 7, the POI data may indicate an express bus terminal station, Shinsegae department store, and Banpo police patrol unit of Seoul Seocho Police Station. A road indicates a common road for general traffic, and a background indicates a polygon on which buildings, zones, and ground elevations are displayed. The POI service is a service that applies the POI data to the electronic map so that users using the electronic map easily search for a destination to find a search result.

Hereinafter, a method for providing a travel service during a travel period by checking a user's current travel using an AI algorithm provided by the present disclosure will be described in detail with reference to the accompanying drawings. That is, the present disclosure relates to a method for learning a user's daily patterns by using the DNN model described above, determining whether the user is traveling according to whether or not a situation that deviates from the learned daily patterns occurs, and measuring a travel period to provide travel information related with the travel period to a user.

In addition, the present disclosure arranges a travel history (History) and the like generated during the travel period after the end of the user's travel, and provides the user with a schedule after the end of the travel. However, the existing method for providing a travel service checks only the user's current location, and provides a service that enables a user to search for local information and services about the user's current location or a place near the current location.

However, the present disclosure has a difference from the existing method for providing a travel service for automatically checking a user's travel state by learning a daily movement pattern, a commuting time, and the like through the user's home/company location, providing the user with travel information related with the travel period in advance, and providing history and related information that occurred during the measured travel period after the end (or return) of the user's travel.

The determination as to whether the user is traveling in the present disclosure can be confirmed by analyzing a distance between a current location and a home/company/pattern, an error range of a commuting time, and the like, and more specific method thereof will be described later.

The method for providing a travel service provided by the present disclosure can use the AI algorithm (particularly, the DNN model) to (1) learn daily movement patterns, a wake-up time, and a commuting time (working and leaving time) through the location of the home and company and (2) check whether the user is currently traveling based on the distance between the user's current location and the home/company/pattern and the error range of the commuting time, and as a result, can be universally applied to a terminal, an artificial device (AI device), a vehicle and the like.

For example, if it is determined that the user is traveling by the method provided by the present disclosure, the AI device informs the user of weather information (fine dust concentration, and the like) of a travel area, local information about a travel area, real-time traffic situation information of a travel area or a travel route, service for controlling a home Internet of things (IoT) device or the like during the travel period. When the end of the user's travel is detected, the AI device can provide services such as a plan (or schedule) after the end of the travel, classification of photo albums during a travel period, a travel history, and expenditure details during a travel period.

Method for Determining Whether User is Traveling

First, a method for determining whether a user is traveling based on daily patterns learned using a DNN model will be described. It can be determined whether or not the user is traveling through a plurality of conditions as follows. When each condition is passed step by step or sequentially, the accuracy of the determination as to whether the user is traveling is increased.

Condition 1: Learn user's daily movement patterns through a home/company location and compare with the learned daily movement patterns. That is, when detecting that the user deviates from the learned daily movement (or location information) pattern, the AI device can primarily determine that the user is traveling. According to the condition 1, the accuracy of the determination as to whether the user is traveling may be about 20%. The above 20% may be an example, and therefore the accuracy of the determination can be set to another value.

Condition 2: Check whether a user is traveling by comparing a home/company/pattern with a current distance. That is, the AI device can determine whether the user is traveling in consideration of a specific distance and a daily pattern error rate. The AI device can determine whether the user is currently traveling based on whether a specific location (home or company) is included within a specific distance from the user's current location.

For example, when (i) a distance between a user's current location and a home are greater than or equal to a value of (user's current location+Xkm) or when (ii) a distance between the user's current location and a company is greater than or equal to a value (user's current location+Ykm), the AI device can secondarily determine that the user is traveling.

According to the condition 2, the accuracy of the determination as to whether the user is traveling may be about 50%. The X and Y values are natural numbers.

Condition 3: (Home/Company) Check a learning error range of a commuting time to check whether a user is traveling. That is, when the user's (home/company) commuting time exceeds the error range (preset threshold), the AI device can thirdly determine that the user is currently traveling. According to the condition 3, the accuracy of the determination as to whether the user is traveling may be about 80%.

Figure 8:
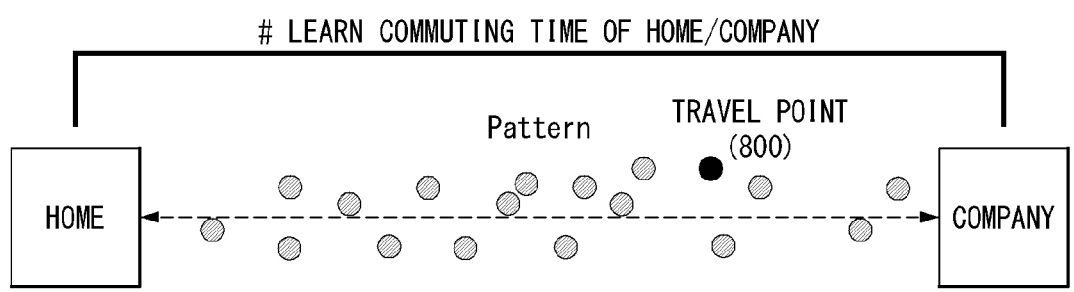
FIG. 8 is a diagram illustrating an example of a daily pattern formed by learning a commuting time of home/company provided by the present disclosure.

FIG. 8 is a diagram illustrating an example of a daily pattern formed by learning a commuting time of home/company provided by the present disclosure. In FIG. 8, when a travel point 800 is included in the user's daily movement pattern, the AI device may not determine whether the user is traveling through the condition 1 and condition 2 described above.

In this instance, the AI device can determine whether the user is currently traveling by comparing the learned commuting time with the actual commuting time, based on the condition 3.

Method for Checking End of Travel and Measuring Travel Period

Next, the method for checking an end (or return) of a user's travel by checking whether the user arrives at home or company and the method for measuring a travel period will be described in detail. First, the travel used in the present specification means leaving the home/company and visiting another location of a certain distance or more, and may be divided into short (that day) and long (more than one night) according to the travel period.

In addition, the travel period may represent a time from a starting point of travel to an end (or return from travel) point of travel, and may be a time from a wake-up point (or departure time point from a home) to the end (or return from travel) point of the travel. First, the AI device checks a reference time range of the user's daily commuting time+a, and when the reference time is exceeded, the AI device determines that the user's travel has ended.

Accordingly, the AI device measures the travel period based on the starting point of the travel and the end point of the travel described above, stores data and history for the travel period, and provides the data and history to the user.

Figure 9:
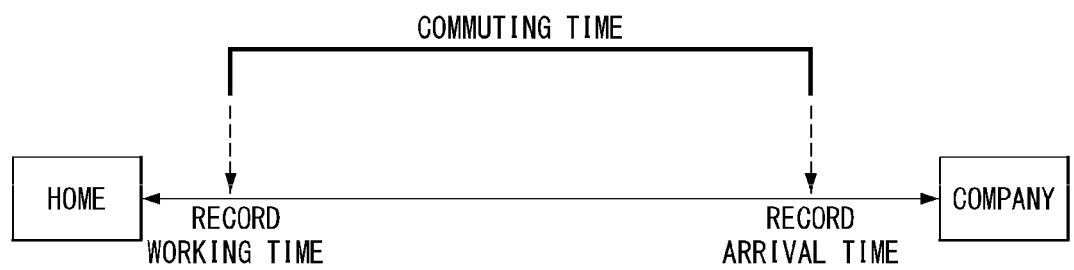
FIG. 9 is a diagram illustrating an example of a method for learning a commuting time provided by the present disclosure.

Next, FIG. 9 is a diagram illustrating an example of a commuting time learning method provided in the present disclosure. Referring to FIG. 9, the commuting time may be a time obtained by subtracting a working time from an arrival time may be a wake-up time or a departure time from a home, and the arrival time may be an arrival time at the company. The pattern of the wake-up time may be learned through a user's app (or application) usage history, device sensor (movement) information, and home IoT usage information.

Definition of Time Point of Travel and Travel Period

Next, a method for defining a time point of travel for calculating a travel period and a travel period required for providing travel information will be described in more detail. The time point of travel may be defined by checking the conditions (conditions 1 to 3) described above, and the travel period may be defined based on the time checked as the time point of travel.

Figure 10:
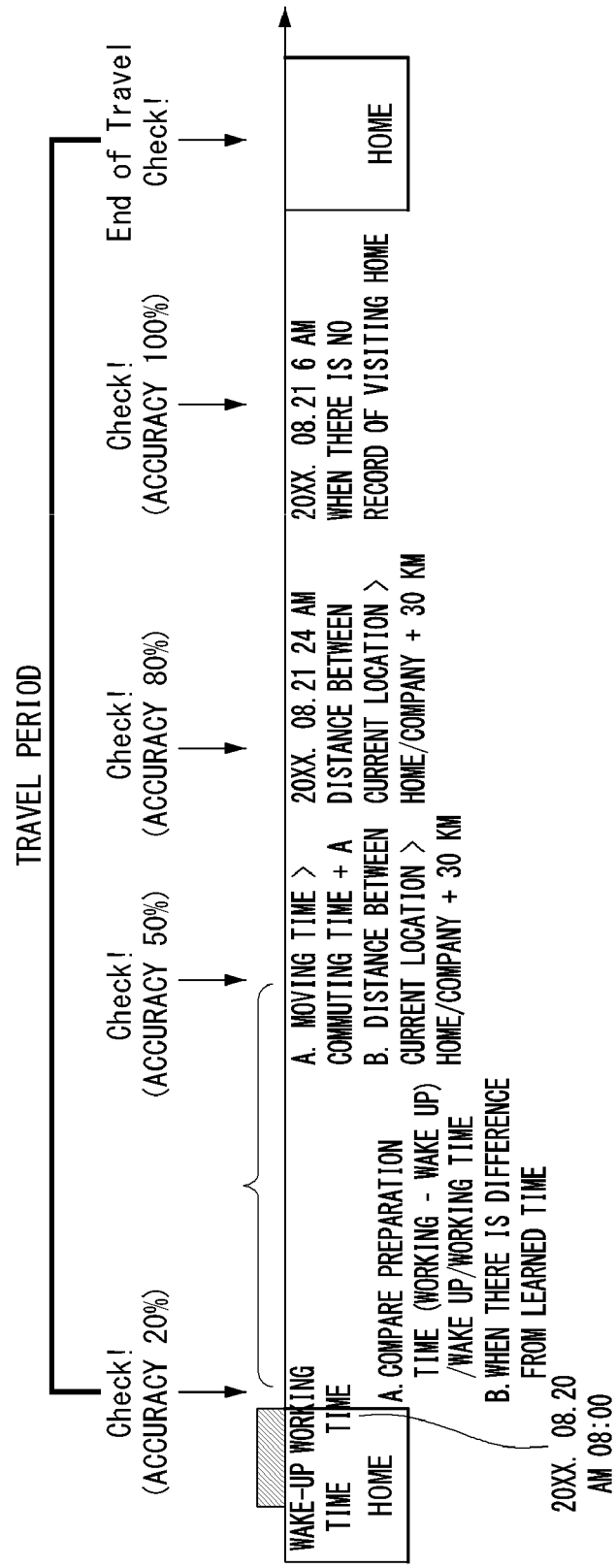
FIG. 10 is a diagram illustrating an example of a method for calculating a starting point of travel and a travel period provided by the present disclosure.

A method for defining a time point of travel based on the following conditions will be described with reference to FIG. 10. In particular, FIG. 10 is a diagram illustrating an example of a method for calculating a starting point of travel and a travel period provided by the present disclosure.

Definition of Time Point of Travel

1. If the user's wake-up/working time differs from the learned pattern, check and record it as the time point of travel.

2. If the user does not arrive at home or work even after user's commuting time+a (natural number) has passed, check and record it as the time point of travel.

3. If a home or a company is not included within a certain distance from the user's current location at 24 o'clock (0 o'clock in the morning) of the wake up or the day when the user goes to work, check and record it as the time point of travel.

4. When there is no record of visiting home at 6 o'clock of the next day of the wake up or the day when the user goes to work, check and record it as the time point of travel.

The more the number of check time points (or recorded time points of travel) of 1 to 4 described above, the more accurate the determination as to whether or not the user is traveling.

Definition of Travel Period

The travel period is defined as the time from the first check point (the first recorded time point of travel) to the end point of travel as described above. This will be described in more detail with reference to FIG. 10.

First, after the AI device compares the user's wake-up time, working time, preparation time (working time—wake-up time) and the like with the pattern learned using the DNN model, when there is a difference, primarily check and record it as the time point of travel. At this time, the accuracy of the determination as to whether the user is traveling may be about 20%.

Here, when the arrival time at home/company corresponds to the learned daily pattern, the AI device checks that the user is not currently traveling, and releases the setting of the travel period. When (1) the travel time is greater than the time of (commuting time+a) and (2) the home or company is not included within a certain distance (for example, 30 km) from the user's current location, the AI device secondarily checks and records it as the time point of travel. At this time, the accuracy of the determination as to whether the user is traveling may be about 50%.

The AI device checks whether a home or a company is included within a specific distance (for example, 30 km) from the user's current location again at 24 hours (or 0 o'clock in the morning) on the day. If a home or a company is not included within the specific distance, the AI device thirdly checks and records it as the time point of travel. At this time, the accuracy of the determination of whether the user is traveling may be about 80%. At this time, the accuracy of the determination as to whether the user is traveling may be about 80%.

In addition, the AI device checks whether there is a home visit record of the user at 6 am the next day. When there is no record of the user's home visit at that time, fourthly check and record it as the time point of travel. At this time, the accuracy of the determination as to whether the user is traveling may be about 100%.

The AI device checks the arrival time at user's home and records it as the end point of travel. The AI device can provide a travel related service to the user according to the level of the check confirmed step by step. In addition, the AI device can provide a more accurate travel service to the user by utilizing the result when detecting a travel related item in the search contents of the user from two days before the starting point of travel.

That is, the present disclosure has an effect of increasing the accuracy of measuring whether or not the user is traveling and the travel period by checking the travel time in time instead of determining the travel period at the date level.

Method for Providing Travel Information During Travel Period or after End of Travel Next, a method for providing travel information during the travel period and travel information after the end of the travel will be described in detail with reference to FIGS. 11 and 12. In particular, FIG. 11 is a diagram illustrating an example of a travel service during a travel period provided by the present disclosure, and FIG. 12 is a diagram illustrating an example of a travel service during an end of travel provided by the present disclosure. Referring to FIG. 11, when the AI device determines that the user is traveling based on the above-described methods, real-time traffic situation information (FIG. 11(*a*)) related with a travel area or a travel route, alarm setting information for changing a preset alarm (FIG. 11(*b*)) and the like may be provided. The alarm setting information may be information for requesting a change of a set alarm every morning.

Referring to FIG. 12, when the AI device determines that the user's travel ends by the above-described methods, the AI device can arrange and provide photographs as an album during the travel (FIG. 12(*b*)), notify the schedule after the end of the travel (FIG. 12(*a*)), and provide information on expense items spent during the travel (FIG. 12(*c*)).

Figure 13:
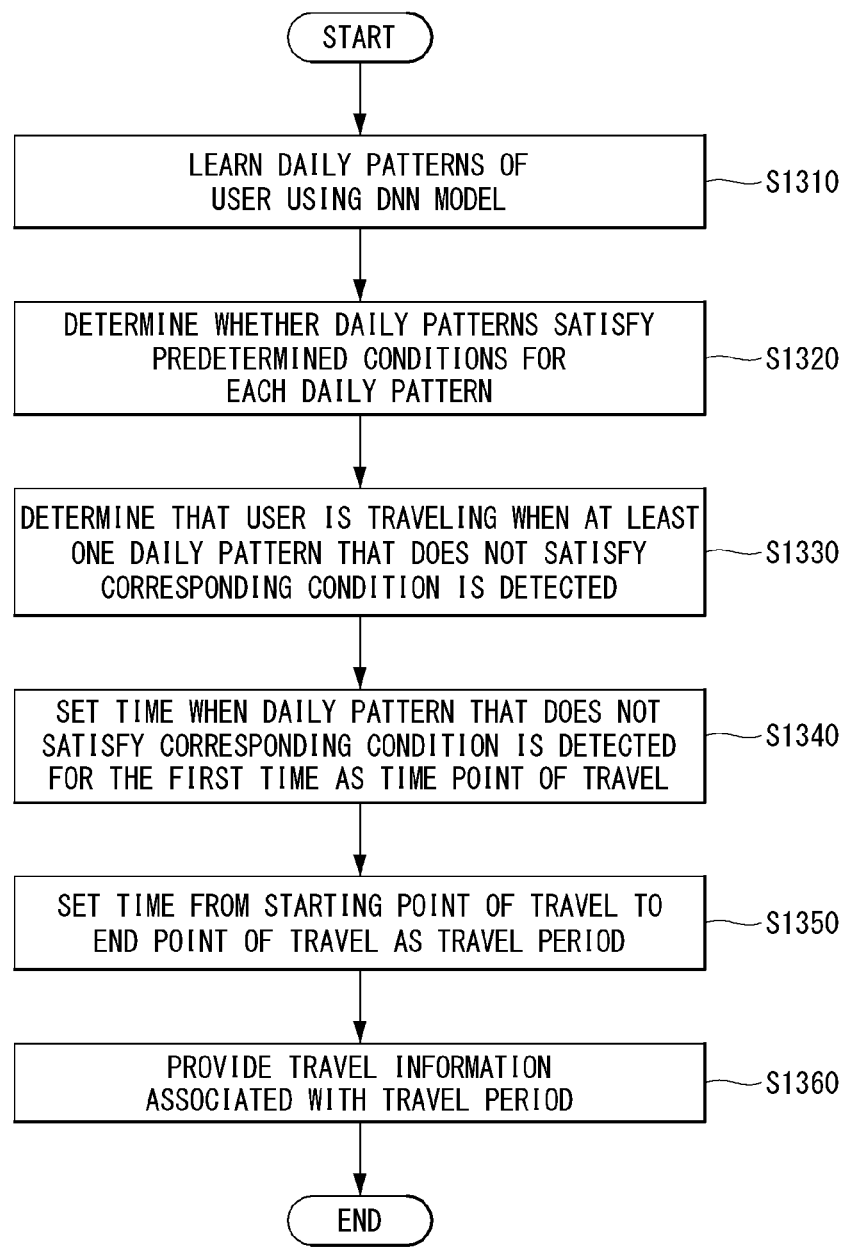
FIG. 13 is a flowchart illustrating a method for operating an AI device for performing a method for providing a travel service provided by the present disclosure.

Next, FIG. 13 is a flowchart illustrating a method for operating an artificial device for performing a method for providing a travel service provided by the present disclosure. First, the artificial device (or an AI device) learns daily patterns related with a user's wake-up time, a commuting time, and a movement path using a deep neural networks (DNN) model (S1310).

The artificial device determines whether daily patterns satisfy predetermined conditions for each daily pattern (S1320). In this instance, the determination may be performed at every time the daily patterns are generated. Here, the predetermined conditions may include (i) a condition on whether the user's wake-up time and/or working time is in a preset time range, (ii) a condition on whether the user's commuting time is in a preset time range, (iii) a condition on whether a particular location is included within a certain distance from the user's current location, and (iv) a condition on whether a user visits a home within a certain time. The specific location may be a home or a company.

When the artificial device detects at least one of daily patterns that do not satisfy the corresponding conditions, the artificial device determines that the user is currently traveling (S1330). In addition, the artificial device sets a point in time at which the daily pattern for which the corresponding condition is not satisfied is detected for the first time as the starting point of the travel (S1340).

Further, when detecting the end of the user's travel, the artificial device sets the time from the set starting point of the travel to the end point of the travel as the user's travel period (S1350). The artificial device provides the travel information related with the travel period (S1360).

In step S1360, first travel information related with the user's travel area or travel route during the travel period may be provided. Additionally, in step S1360, second travel information including a travel history generated during the travel period after the end of the user's travel and a schedule after the end of the travel may be provided. Here, the first travel information may include at least one of the real-time traffic situation information of the travel area, the preset alarm change information, the weather information of the travel area, or the home Internet of Things (IoT) control information.

The artificial device can provide the first travel information based on search information related with a travel area before travel. The travel history may include at least one of expenditure details information, a photo album, or a travel route. Here, the end of the user's travel may be a time when it is detected that the daily pattern not satisfying the corresponding condition satisfies the corresponding condition again. In addition, as the number of daily patterns that do not satisfy the above conditions increases, the accuracy of the determination as to whether the user is traveling may increase.

Figure 14:
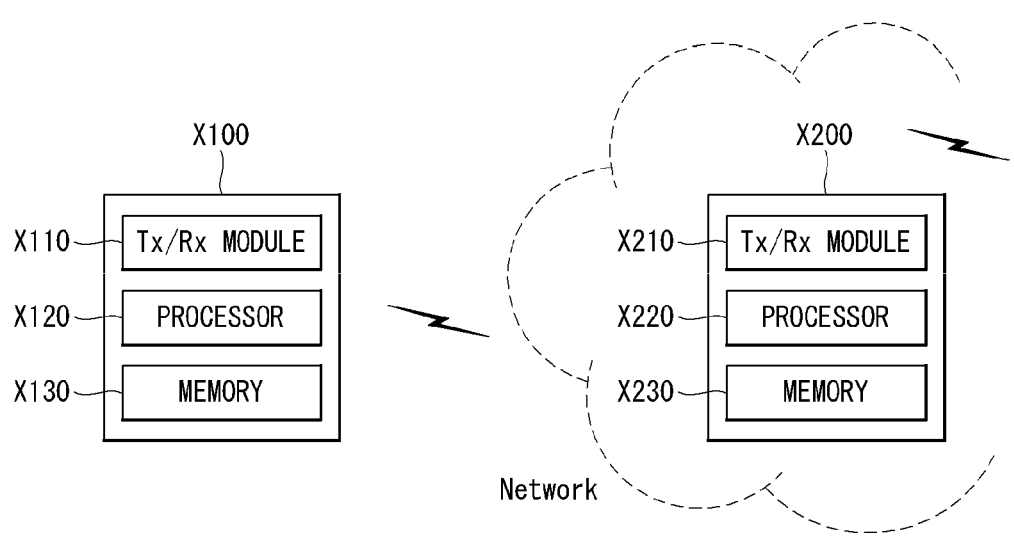
FIG. 14 is a diagram illustrating an example of a general device to which the present disclosure can be applied.

Next, FIG. 14 relates to a general device to which the present disclosure can be applied. Referring to FIG. 14, an artificial device X100 according to an embodiment of the present disclosure includes a communication module X110, a processor X120, and a memory X130. The communication module X210 may also be referred to as a radio frequency (RF) unit. The communication module X110 can be configured to transmit various signals, data and information to an external device and to receive various signals, data and information to an external device. The server X200 may be connected to the external device in a wired and/or wireless manner. The communication module X210 may be implemented by being separated into a transmitter and a receiver. The processor X220 can control the overall operation of the server X200, and be configured to cause the server X200 to perform a function of computing information to be transmitted/received and the like to and from the external device. In addition, the processor X220 may be configured to perform the operation of the travel service provided by the present disclosure. The processor X220 can control the communication module X110 to transmit data or a message to the UE, another vehicle, or another artificial device according to the proposal of the present disclosure. The memory X230 may store the computed information and the like for a preset time and may be replaced with a component such as a buffer.

In addition, the specific configuration of the artificial device X100 and the server X200 as described above may be implemented so that the matters described in various embodiments of the present disclosure can be applied independently or two or more embodiments are applied at the same time.

The specific implementation operation of the artificial device for providing a travel service provided by the present disclosure will be described. First, the artificial device can include a communication module for transmitting and receiving a wireless signal, a memory, a display for displaying travel information related with a travel period to a user, and a processor in order to provide a travel service provided by the present disclosure.

The processor learns the daily patterns related with the user's wake-up time, commuting time, and travel route using a deep neural networks (DNN) model, and determines whether the daily patterns satisfy predetermined conditions for each daily pattern every time the daily patterns are generated.

When the processor may perform control to detect at least one daily pattern that does not satisfy the corresponding condition, the processor determines that the user is currently traveling, start, as the travel time of the travel, the time when the daily pattern that does not satisfy the corresponding condition is detected for the first time, and set the time from the starting point of the travel to the end point of the travel as the travel period of the user when the end of the user's travel is detected.

The processor can perform control to provide the first travel information related with the user's travel area or travel route during the travel period. The processor can perform control to provide the second travel information including the travel history generated during the travel period after the end of the travel and the schedule after the end of the travel.

Here, the first travel information may include at least one of the real-time traffic situation information of the travel area, the preset alarm change information, the weather information of the travel area, or the home Internet of Things (IoT) control information. The processor can perform control to provide the first information based on the search information related with the travel area before the travel. The travel history may include at least one of expenditure details information, a photo album, or a travel route.

The predetermined conditions may include the condition on whether the user's wake-up time and/or working time is in the preset time range, the condition on whether the user's commuting time is in the preset time range, the condition on whether the particular location is included within a certain distance from the user's current location, and the condition on whether the user visits a home within a certain time. The specific location may be a home or a company.

The processor can determine that the travel ends when it is detected that the daily pattern that does not satisfy the corresponding condition satisfies the corresponding condition again. As the number of daily patterns that do not satisfy the above conditions increases, the accuracy of the determination as to whether the user is traveling may increase.

The present disclosure described above can be embodied as a computer readable code on a medium in which a program is recorded. A computer readable medium may include all kinds of recording devices in which data that may be read by a computer system are stored. An example of the computer readable medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disk, an optical data storage, and the like. Therefore, the above-mentioned detailed description is to be interpreted as being illustrative rather than being restrictive in all aspects. The scope of the present disclosure is to be determined by reasonable interpretation of the claims, and all modifications within an equivalent range of the present disclosure fall in the scope of the present disclosure.

Although the service and the embodiments have been mainly described hereinabove, this is only an example and does not limit the present disclosure. Those skilled in the art to which the present disclosure pertains may understand that several modifications and applications that are not described in the present specification may be made without departing from the essential characteristics of the services and the embodiments. For example, each component described in detail in the embodiments of the present disclosure may be modified and combined. In addition, differences related with these modifications and applications are to be interpreted as being included in the scope of the present disclosure as defined by the following claims.

According to an embodiment of the present disclosure, it is possible to help the user more clearly achieve the essential purpose (recreation, tourism) of the travel by eliminating the additional inconvenience during the travel period. In addition, according to an embodiment of the present disclosure, the history and card expenditure details are automatically arranged during the travel period after the returning from the travel, so that the user can have a deeper aftertaste for travel and help adapt to daily life after the end of the travel.

Effects which can be achieved by the present disclosure are not limited to the above-mentioned effects. That is, other objects that are not mentioned may be obviously understood by those skilled in the art to which the present disclosure pertains from the following description.

What is claimed is:

1. A method for controlling an artificial intelligent (AI) device providing a travel service, the method comprising:
   learning, via a processor of the AI device, a plurality of daily patterns related with a user's wake-up time, a commuting time, and a travel route using a deep neural networks (DNN) model;
   determining, via the processor, whether the daily patterns satisfy predetermined conditions each time a corresponding daily pattern among the plurality of daily patterns is generated;
   determining, via the processor, that the user is currently traveling when at least one daily pattern among the plurality of daily patterns that does not satisfy the predetermined conditions is detected;
   setting, via the processor, a time when the at least one daily pattern that does not satisfy the predetermined conditions is detected for a first time as a starting point of travel;
   setting, via the processor, a time from the starting point of the travel to an end point of the travel as a travel period of the user when an end of the user's travel is detected; and
   outputting travel information related with the travel period,
   wherein the outputting of the travel information includes displaying, via a display of the AI device, first travel information related with a travel area or a travel route during the travel period,
   wherein the outputting of the travel information includes displaying, via the display, second travel information including a travel history generated during the travel period after the end of the travel and a schedule after the end of the travel, and
   wherein the travel history includes expenditure details information, a photo album, and the travel route.

2. The method of claim 1, wherein the first travel information includes at least one of real-time traffic situation information of the travel area, preset alarm change information for changing preset alarms, weather information of the travel area, or home Internet of Things (IoT) control information.

3. The method of claim 1, wherein the first travel information is output based on search information related with the travel area before the travel.

4. The method of claim 1, wherein the predetermined conditions include a condition on whether a user's wake-up time and/or working time is in a preset time range, a condition on whether the user's commuting time is in a preset time range, a condition on whether a particular location is included within a certain distance from a user's current location, and a condition on whether a user visits a home within a certain time.

5. The method of claim 4, wherein the particular location is a home or a work space.

6. The method of claim 1, wherein the end of the user's travel is a time when it is detected that the at least one daily pattern does not satisfy the predetermined conditions satisfies the predetermined conditions again.

7. The method of claim 1, wherein the DNN model is learned so that as the number of daily patterns that does not satisfy the predetermined conditions increases, an accuracy of the determination on whether the user is traveling increases.

8. An artificial intelligence (AI) device for providing a travel service, the AI comprising:
   a transceiver configured to transmit and receive a wireless signal;
   a memory;
   a display; and
   a processor configured to:
   learn a plurality of daily patterns related with a user's wake-up time, a commuting time, and a travel route using a deep neural networks (DNN) model;
   determine whether the daily patterns satisfy predetermined conditions each time a corresponding daily pattern among the plurality of daily patterns is generated;
   determine that the user is currently traveling when at least one daily pattern among the plurality of daily patterns that does not satisfy the predetermined conditions is detected;
   set a time when the at least one daily pattern that does not satisfy the predetermined conditions is detected for a first time as a starting point of travel;
   set a time from the starting point of the travel to an end point of the travel as a travel period of the user when an end of the user's travel is detected; and
   control the display to display travel information related with the travel period,
   wherein the processor controls the display to display the first travel information related with a travel area or a travel route during the travel period,
   wherein the processor controls the display to display second travel information including a travel history generated during the travel period after the end of the travel and a schedule after the end of the travel, and
   wherein the travel history includes expenditure details information, a photo album, and the travel route.

9. The AI device of claim 8, wherein the first travel information includes at least one of real-time traffic situation information of the travel area, preset alarm change information for changing preset alarms, weather information of the travel area, or home Internet of Things (IoT) control information.

10. The AI device of claim 8, wherein the first travel information is displayed based on search information related with the travel area before the travel.

11. The AI device of claim 8, wherein the predetermined conditions include a condition on whether a user's wake-up time and/or working time is in a preset time range, a condition on whether the user's commuting time is in a preset time range, a condition on whether a particular location is included within a certain distance from a user's current location, and a condition on whether a user visits a home within a certain time.

12. The AI device of claim 11, wherein the particular location is a home or a work space.

13. The AI device of claim 8, wherein the processor determines that the travel ends when detecting that the at least one daily pattern that does not satisfy the predetermined conditions satisfies the predetermined conditions again.

14. The AI device of claim 8, wherein the DNN model is learned so that as the number of daily patterns that does not satisfy the predetermined conditions increases, an accuracy of the determination on whether the users is traveling increases.

\* \* \* \* \*